United States Patent [19]

Deakin

[11] Patent Number: 4,813,590
[45] Date of Patent: Mar. 21, 1989

[54] METHOD FOR JOINING PLASTIC COMPONENTS

[76] Inventor: David Deakin, 19608 Enterprise Way, Gaithersburg, Md. 20879

[21] Appl. No.: 87,202

[22] Filed: Aug. 20, 1987

[51] Int. Cl.⁴ .............................................. B23K 31/00
[52] U.S. Cl. ................................... 228/120; 228/121;
228/124; 228/128; 228/222; 228/263.12;
285/423; 285/238; 285/287; 285/288; 156/276;
427/203; 427/204
[58] Field of Search ............... 228/120, 121, 124, 128,
228/135, 203, 208, 222, 263.12, 903; 285/287,
288, 238, 259, 260, 423, DIG. 24; 156/276;
427/203, 204, 205

[56] References Cited

U.S. PATENT DOCUMENTS

| | | | |
|---|---|---|---|
| 1,827,297 | 10/1931 | Moore | 228/128 |
| 2,600,220 | 6/1952 | Doelker, Jr. et al. | 228/120 |
| 2,848,802 | 8/1958 | Luks | 228/121 |
| 3,676,920 | 7/1972 | Pilditch | 228/120 |
| 4,011,354 | 3/1977 | Drostholm et al. | 427/203 |
| 4,172,547 | 10/1979 | DelGrande | 228/124 |
| 4,296,300 | 10/1981 | Bottiglia | 228/222 |
| 4,591,088 | 5/1986 | Mulliner et al. | 228/240 |

FOREIGN PATENT DOCUMENTS 691754 7/1965 Italy ................................. 285/287

OTHER PUBLICATIONS

"Tempil" Anti-Heat Flyer, Big Three Industries, Inc., South Plainfield, N.J., Apr., 1977.

*Primary Examiner*—M. Jordan
*Assistant Examiner*—Samuel M. Heinrich
*Attorney, Agent, or Firm*—Cushman, Darby & Cushman

[57] ABSTRACT

To alter the surface qualities of nonreactive materials, such as polypropylene and polyethylene in order to provide a means for bonding the plastic to metal, hard granular materials of oxides or carbides are partially impregnated into the surface of the plastic by application of heat and pressure so that granular edges remain exposed. Thereafter, a silver coating is applied over the impregnated plastic to interlock with the granules. The composite layered plastic then provides a means for soldering or bonding the plastic to a metallic coupling using either a bonding cement or a low temperature solder such as bismuth, lead, or tin based solder. Abrasion-resistant qualities also are improved by impregnating the internal surfaces of a plastic tube in order to improve its wear-resistance during transporting abrasive slurries of sand, coal, and the like.

16 Claims, 5 Drawing Sheets

METHOD FOR JOINING PLASTIC COMPONENTS

BACKGROUND OF THE INVENTION

This invention pertains to a method for joining plastic components, but more specifically, to a method for treating surfaces of plastic components to attain surface qualities suitable for joining them to dissimilar materials.

In recent years, plastics have become widely used for such purposes as plumbing, building and construction, storage containers, to name a few, primarily due to its inexpensive and abundant nature. In certain applications, however, plastic materials lack sufficient strength. Yet in other cases, its corrosion resistance properties are highly desirable as being acid-resistant for use as, for example, the storage and transport of acids and other corrosive materials. However, plastics are desirable for many applications, they have many shortcomings compared to most metals, stainless steel, copper, brass and the like which have higher strength, adhesive and/or wear-resistant qualities.

Polyethylene and polypropylene, have proven more desirable in many instances because they are so inert, e.g., corrosion resistant. These plastic are nonreactive to chemicals. Their inert qualities however make them difficult to join together by bonding, welding, soldering, cementing and other conventional joining techniques. They cannot be soldered or brazed, for examle, due to their relatively low melting point and ability to fuse with or to most other materials. Conventional mechanical couplings are also impractical in light of the relatively weak strength and high flow or creep characteristic of the plastic. Further, in many applications, adhesive materials and bonding cement lack corrosive resistance in the environment to which the plastics are exposed. Additionally, some plastics such as polyethylene and polyproplylene are nearly impossible to bond securely.

Accordingly, it is an objective of the present invention to provide a method for treating the surface of plastic materials, such as polyethylene, polypropylene and polyvinyl chloride (PVC) and the like, in a manner to widen its utilization as a material suitable for plumbing and/or used as a general building and construction material.

It is another objective of the present invention to provide a means by which plastic components can be joined together by an efficient, secure and practical method.

It is a further objective of the present invention to provide a method of treating the surface of plastic materials to improve their wear-resistant qualities.

These and other advantages, aspects and objectives of the invention will become more readily apparent upon review of the succeeding disclosure.

SUMMARY OF THE INVENTION

In accordance with one aspect of the present invention, a method for joining a plastic component to a body of dissimilar material comprises the steps of impregnating the end portion of the plastic component with a hard granular material, coating the impregnated surface with a thin layer of metal, such as silver, copper or nickel thereby to establish an interlocking relationship between the metal layer and impregnated plastic surface, arranging together the plastic component and body of dissimilar material in assembled relationship, and joining the plastic component and body by conventional means as soldering or cementing. Preferred granular materials include aluminum oxide and silicon carbide. Softening may be achieved by heating and/or chemically dissolving.

In the case where soldering is employed, the method includes providing a low temperature solder whose melting point is lower than the plastic. Cementing and soldering (or the like) provides interlocking between the plastic component and the body by virtue of mechanical bonding among the solder, granule-impregnated plastic and the body. Two plastic components may also be joined by impregnating and soldering a portion of each plastic component, or by using a metallic sleeve in the case of joining plastic tubes. Tubes, couplings, bar, plate and other stock materials may be joined by the methods taught herein.

In another aspect of the invention, a method is provided for securing a metallic layer to the surface of plastic materials by impregnating the surface as aforestated, and applying a metallic coating to the impregnated surface thereby to form an interlocking relationship therewith.

In yet a further aspect of the invention, a method is provided for increasing the wear-resistance qualities of plastic by impregnating the surface thereof with wear-resistant granular particles such as aluminum oxide or silicon carbide by the aforestated procedure.

Other features, aspects and advantages of the invention will become more readily apparent upon review of the following description taken in connection with the accompanying drawings. The invention, though, is pointed out with particularity by the appended claims.

DETAILED DESCRIPTION OF THE INVENTION

As previously explained, the invention has application in providing wear-resistance surface qualities of plastic materials, such as polyethylene, polypropylene, vinyls and the like; and/or for altering the surface qualities thereof to provide adhesive compatibility with other materials, such as metals, ceramics, wood and the like. By the lending of abrasion resistant qualities to plastic materials such as tubes and pipes, slurries of coal, sand, and the like may be carried more economically without frequent replacement or ruptures.

In the case where plastic materials are to be joined with other dissimilar materials such as brass, copper or stainless steel, surface qualities of the plastic can be altered in such a manner such that mechanical bonding can be achieved by conventional soldering, epoxy, or other bonding systems in accordance with this invention. Plastic components and bodies of dissimilar materials of a variety of shapes and configurations may be joined.

Figure 1:
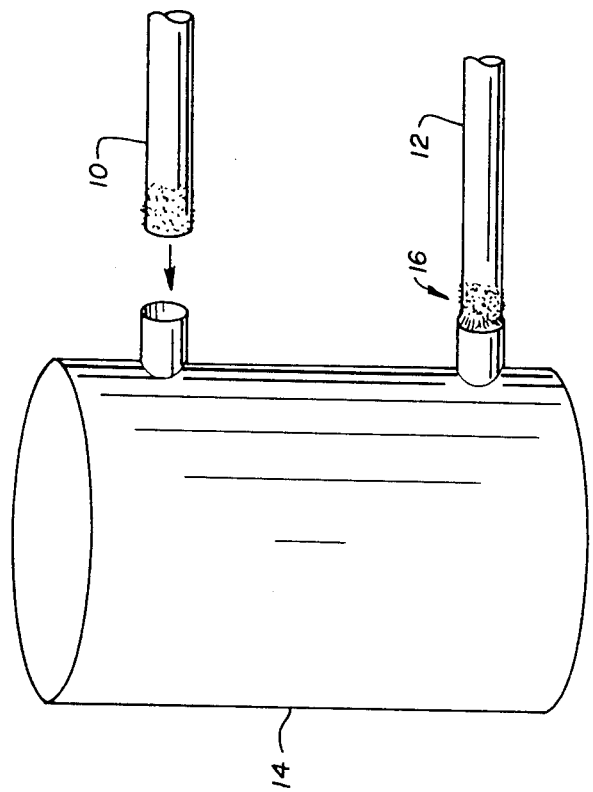
FIG. 1 depicts a metallic tank and plastic tubes in joined and unjoined relationships therewith.

FIG. 1, for example, depicts the adjoining of plastic tubes 10 and 12 to a metallic tank 14 by soldering. A soldering bead is formed at joint 16 by known techniques. Tank 14 may be constituted by copper, steel, brass, or other metals depending upon the application. The ends of plastic tubes 10 and 12 are prepared in accordance with one aspect of this invention by impregnating hard granules of oxides or carbides, over which a metallic coating is placed by vacuum or chemical deposition, painting, spray metallizing, metallic inks, sputtering or other known means.

Figure 2:
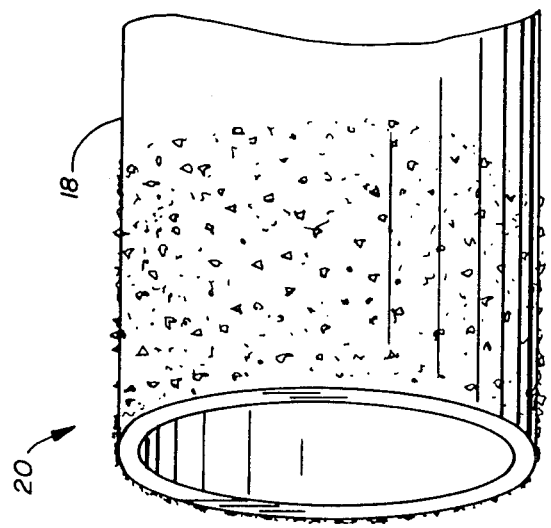
FIG. 2 is an enlarged perspective view of an end segment of an impregnated plastic tube.

To prepare the end portion of a plastic tube for joining to a body of dissimilar material, FIG. 2 depicts an end portion of a thermoplastic tube 18 having a multitude of granules generally depicted by 20 which have been forced into the external surface of the tube by application of heat and pressure. The granules 20 comprise a hard material such as aluminum oxide, silicon carbide, or silicon oxide, for example. Other materials or powders may also be used. In the practice of the invention, oxides and carbides were found to be most preferential for polyethylene and polypropylene plastic materials. For providing abrasion resistance as well as altered surface qualities for soldering or cementing, aluminum oxide and silicon carbides were found to be acceptable granules. Particle sizes range between 50 grit and 600 grit, for example. A low temperature solder such as bismuth, indium or lead-base solder having a melting point lower than the melting point of the thermal plastic material provides a practical means for joining by soldering.

Figure 3:
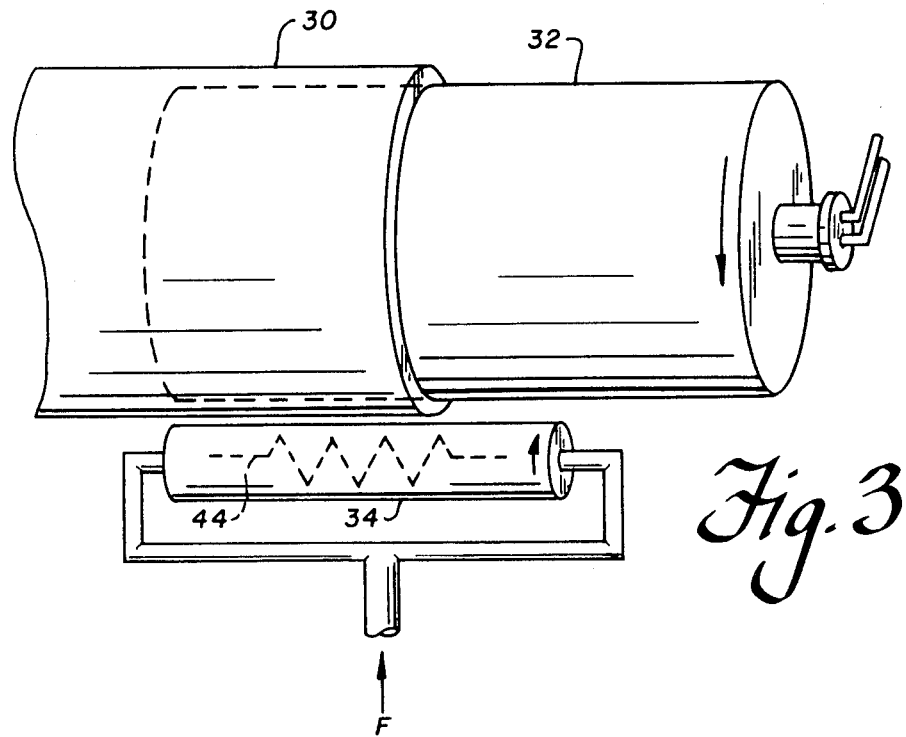
FIGS. 3 and 4 illustrates front and side views of a preferred apparatus used to impregnated a plastic tube with hard granules by heat and pressure according to an aspect of the present invention.
Figure 4:
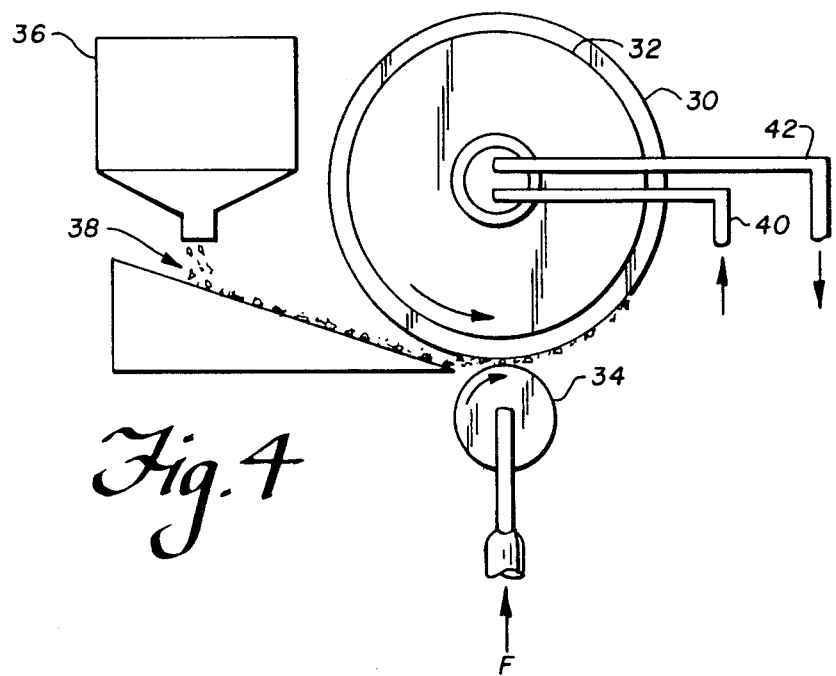

FIGS. 3 and 4 illustrates one method by which the ends of plastic tubes may be treated in accordance with an aspect of the invention. The end 30 of a tube is placed between rollers 34 which are counter-rotated in a fashion to pinch the walls of the tube 30 while at the same time carbide or oxide granules from a hopper 36 are supplied between the pinch rollers 32 and 34 in order to force the granules 38 into the external surface of the tube 30. During rotation, a heating element internal of roller 34 partially melts or raises the temperature of the external surface of thermoplastic tube 30 to a point where it softens in order to enable the granules 38 to become impregnated into the surface thereof. The other roller 32 inside the tube plastic 30 is provided with cooling chambers (not shown) through which a coolant flows by way of conduits 40 and 42 so as to maintain the rigidity of the tube 30 during heating of its external surface. A resistive heating element 44 inside roller 34 provides a source of heat for softening the plastic tube 30. Rather than providing an internal heating element of the roller 34, external heat may be applied to the tube 30 by means of an open flame or radiant heat from an electrical source.

Preferential results have been attained by heating quickly the surface of the plastic tube 30 to its softening point or melting point, and then physically driving the granular material into the surface thereof so that their edges protrude outward while a portion of these granules remain embedded in the surface. The application of too much force to drive totally the particles into the surface was found to yield poor qualities for interlocking purposes. It is essential that the softened plastic material does not flow over the top of the granules during the application of heat and force. Other methods may be employed for impregnating tubes, or in the case of flat stock plastic, a simple pair of rollers will suffice. In any event, the method of impregnating depends for the most part upon the particular shape of the plastic component being impregnated. Granules may also be blown into a softened surface under acceleration.

Figure 5:
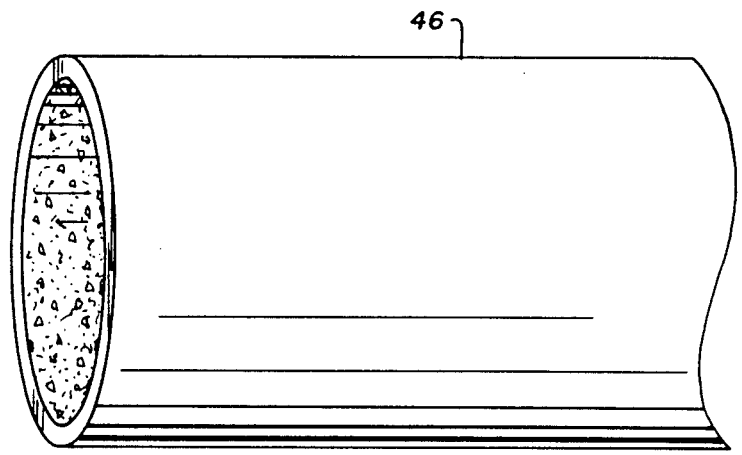
FIG. 5 depicts an end portion of a plastic tube having an internal impregnated surface.

FIG. 5 depicts a tube 46 wherein the granules are embedded on the internal surface thereof. The internal surface of the tube 46 has now been reinforced in order to carry abrasive slurries such as coal and sand with improved wear-resistance. In this case, requirements of carefully embedding the granules are somewhat relaxed since any totally embedded particle will soon become exposed after use in carrying abrasive slurries. One method of achieving impregnation is to provide a carriage carrying the granules and travelling internal of the tube in a fashion to apply outward force against the granules and internal wall of the tube. Of course, such an arrange is limited to tubes of relative larger diameters that permit entry of the travelling carriage. Another method is to spray a mixture of molten plastic and granules onto the internal wall of the tube. Still yet another method would be to spray heated granules against the plastic surface, the granules being hot enough to partially melt the plastic and embed themselves therein.

Against the impregnated surface of the plastic tube of FIGS. 2 and 5, a layer of dissimilar material, such as a metallic layer, may be placed thereon to interlock with the granules. In essence, this aspect of the invention advantageously provides means to alter the surface quality of the plastic tube to fit whatever application desired.

Figure 6:
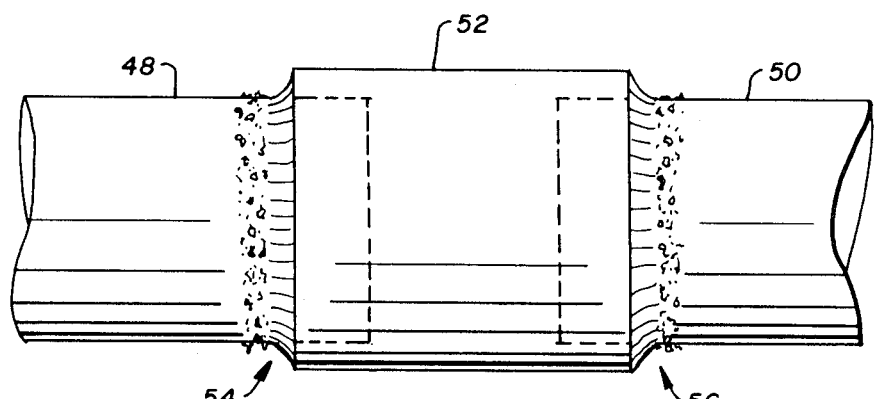
FIG. 6 illustrates respective end portions of plastic tubes treated according to the present invention and coupled by a metallic sleeve by soldering.

FIG. 6 depicts two respective ends of plastic tubes 48 and 50 having been treated on the external surface thereof and joined to a metallic sleeve 52, such as brass or copper, by means of a solder connection 54 and 56. In treating the respective ends of the plastic tubes 48 and 50, best results were achieved by coating the granular-impregnated surfaces of tubes 48 and 50 with a metal, such as silver. One method of applying silver entails the use of commercially available flexible polymer ink by painting or spraying. Liquid silver also may be used as a coating. Not only silver, but any suitable metal may be layered on the impregnated plastic surface by inking, spraying, painting, vacuum or chemical deposition, sputtering, electroless plating, and other known depositing techniques. Nickel and silver have proven particularly useful for providing solder connections.

Figure 7A:
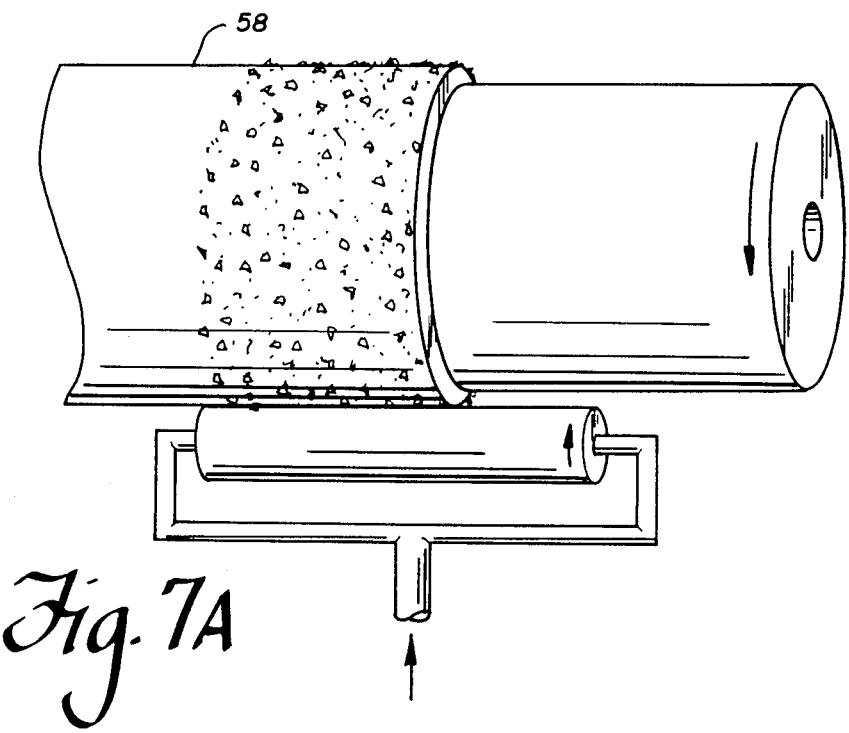
FIGS. 7A and 7B illustrate steps for impregnating and coating with a metal an end portion of a plastic tube according the present invention.
Figure 7B:
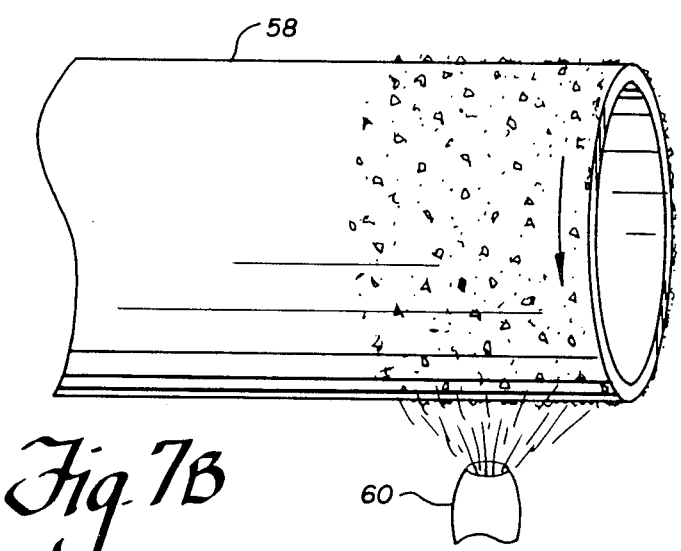

Referring to FIGS. 7A and 7B, the end of a tube 58 is first impregnated with granules by means of heat and pressure, as previously explained and subsequently sprayed with a liquid silver compound, such as a silver polymer ink, by means of a nozzle 60. Afterwards, the silver coating is baked or heated to solidify the same. This is an established technique. A silver coating can also be sprayed by forcing molten silver under a stream of pressurized inert gas, or alternatively, by coating with a silver compound by conventional silvering techniques as known in the art. When spraying or applying hot molten metals, care must be taken to apply very thin successive layers allowing the surface of the plastic to cool after each application. This is to prevent the surface of the plastic from melting or becoming soft which might allow the granules to loosen. In this fashion, the granules provide interlocking characteristics for the on-laid silver coating. The silver coating then provides surface qualities particularly suitable for soldering the treated plastic tube to a metallic sleeve or coupling.

In an alternative embodiment of the invention, a mixture of aluminum oxide and plastic powder is sprayed on a plastic material, such as a tube or sheet, while applying heat to the sprayed mixture and/or the plastic tube or sheet. The mixture of plastic and granules fuses to the plastic surface in order to improve the wearing qualities of the surface. Not only may the mixture be sprayed upon other plastic materials, but it can also be applied to a steel or other substrate in order to improve its wear-resistance qualities. The preferred method uses polyethylene or polypropylene.

Figure 8A:
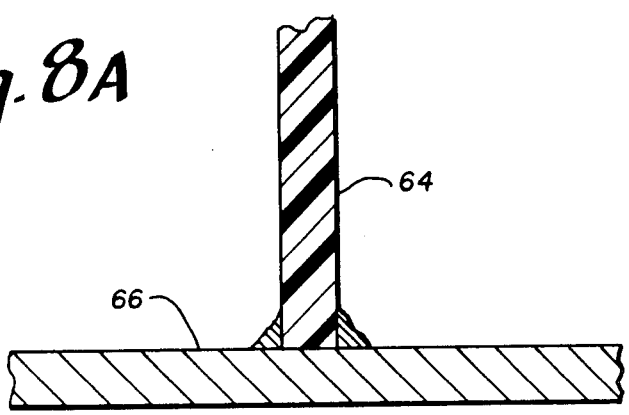
FIGS. 8A and 8B show joining of plastic plate stock to a plate of dissimilar material according to the present invention.
Figure 8B:
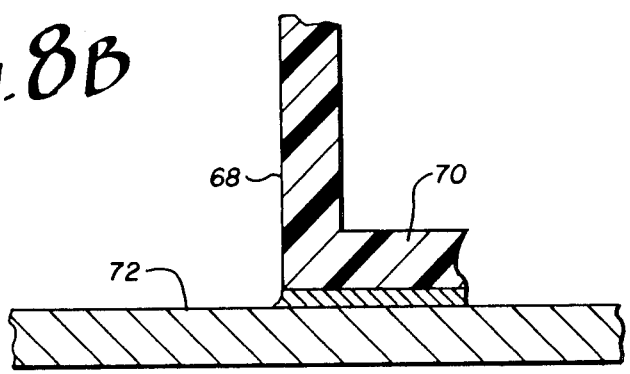

FIGS. 8A and 8B simply show the application of the inventive principles to materials of other shapes wherein a plastic sheet 64 is bonded to a sheet 66 of dissimilar material, and a plastic sheet 68 couples a sheet 72 by way of its flange 70.

It is apparent to those skilled in the art that several alterations and modifications can be made in view of the above teachings without departing from the intent and scope of the invention as defined by the appended claims. The invention has as its aim to alter the surface qualities of materials to improve their characteristics for a particular purpose. In one example, the invention aims to alter the surface qualities of thermoplastic materials such as polyethylene and polypropylene to improve their adhering qualities for soldering or joining by cementing to couplings or sleeves. Not only may the techniques be applied to tubes, but plastic sheet material, flanges or the like may be treated so as to improve its adhering qualities which it did not have before. In a second aspect of the invention, abrasion-resistance or wear-resistance qualities are attained by spraying granulated carbides or oxides on the surface of a plastic material. This aspect is particularly useful for improving the wear resistant qualities of tubular plastic pipes which carrying abrasive slurries of coal, sand, and the like. This aspect has application on surface qualities, generally, rather than being particularly limited to the internal surfaces of plastic tubes and pipes. Accordingly, it is the intent of the invention to encompass all such changes and modifications as may become known to those skilled in the art in view of the above teachings, rather than limiting the invention to what is shown or described.

What is claimed to be secured by U.S. Letters Patent is as follows:

1. A method for hermetically joining a plastic component having a substantially inert surface to a body of dissimilar material having a surface quality suitable for bonding, said method comprising the steps of: granular material,
    coating said impregnated portion with a layer of material so as to form a surface quality thereon which is suitable for bonding, said coating being secured to said inert surface by adhesion and by an interlocking relation between said coating and said embedded granular material,
    arranging together said plastic portion and said body of dissimilar material in a relationship to be joined at a junction thereof, and
    bonding said respective components using a bonding substance so as to form a hermetic seal at said junction for containing fluids whereby the surfaces are held together in locking relationship by virtue of mechanical bonding among the bonding substance, granules and plastic.

2. A method as recited in claim 1 wherein said bonding substance is a low-temperature solder whose melting point is lower than the melting point of said plastic.

3. A method as recited in claim 2 further comprising the step of:
    providing a heat sink about the portion of said plastic being joined during the soldering process whereby to reduce the amount of heat flow into the plastic material during the soldering process.

4. A method as recited in claim 1 wherein said granules are impregnated into the respective surfaces by application of mechanical force and heat.

5. A method as recited in claim 1 wherein said granules are selected from the group comprising aluminum oxide, silicon oxide and silicon carbide.

6. A method as recited in claim 1 further comprising the step of:
    providing a heat sink about the portion of said plastic being joined during the impregnating process whereby to reduce the amount of heat flow into the plastic material during the soldering process.

7. A method as recited in claim 1 further comprising, during the impregnating step, heating said granules and subsequently spraying said heated granules thereby to effect softening of the surface and fusing of said heated granules to said surface upon cooling of the plastic.

8. A method for hermetically joining a metallic coupling to a plastic component having a substantially inert surface, said method comprising the steps of:
    impregnating a portion of the surface of said plastic component with granules suitable for forming an interlocking relationship therewith,
    applying a metallic coating over the entire area of said impregnated portion of said plastic component, said metallic coating being secured to said inert surface by adhesiion and by an interlocking relation between said coating and said impregnated granules,
    placing together the metallic coupling and the plastic component in a joining relationship, and
    soldering said metallic coupling to the end of the impregnated portion of said plastic component using a low temperature solder having a melting point lower than said plastic component whereby the metallic coupling and plastic component are hermetically joined together by virtue of a mechanical bond among the metallic coupling, solder, granules, metallic coating and plastic component.

9. A method as recited in claim 8 further comprising the step of:
    providing a heat sink near the solder connection during the soldering process to reduce the amount of heat flow into the plastic component.

10. A method as recited in claim 8 wherein said granules are impregnated into the plastic component by application of mechanical force and heat.

11. A method as recited in claim 8 wherein said granules are impregnated into the plastic component by spraying said granules and simultaneously heating the granules and plastic component.

12. A method as recited in claim 8 wherein said granules are selected from the group of aluminum oxide, silicon oxide, and silicon carbide.

13. A method as recited in claim 8 wherein the impregnated surface of the plastic is coated with silver prior to the solder step, and wherein said metallic component means comprises copper and said low temperature solder comprising bismuth lead solder.

14. A method as recited in claim 8 further comprising the step of:
providing a heat sink about said portion of said plastic component during the impregnating process to reduce the amount of heat flow into the plastic component.

15. A method as recited in claim 8 further comprising, during the impregnating step, heating said granules and subsequently spraying said heated granules thereby to effect softening of the surface and fusing of said heated granules to said surface upon cooling of the plastic.

16. A method for hermetically joining at least two plastic components having substantially inert surface qualities, said method comprising the steps of:
impregnating respective surfaces of the two plastic components with granules,
applying a bonding layer over the entire area of said respective surfaces, said bonding layer having properties suitable for bonding and functioning to interlock with said impregnated plastic and to seal hermetically said surfaces,
arranging together in assembled relationship the respective surfaces to be joined,
soldering said respective surfaces using a low temperature solder whose melting point is lower than the melting point of the plastic whereby to attain mechanical bonding among the solder, granules, and plastic components.

* * * * *